DISTORTIONLESS ARRAY LINES FOR MEMORIES

Filed Jan. 17, 1966 2 Sheets-Sheet 1

INVENTOR.
WILHELM ANACKER

BY Charles P. Boberg
ATTORNEY

DISTORTIONLESS ARRAY LINES FOR MEMORIES

Filed Jan. 17, 1966 2 Sheets-Sheet 2

3,466,636
Patented Sept. 9, 1969

3,466,636

DISTORTIONLESS ARRAY LINES FOR MEMORIES

Wilhelm Anacker, Yorktown Heights, N.Y., assignor to International Business Machines Corporation, Armonk, N.Y., a corporation of New York Filed Jan. 17, 1966, Ser. No. 521,019
Int. Cl. G11b 5/00; H03h 5/00
U.S. Cl. 340—174 13 Claims

ABSTRACT OF THE DISCLOSURE

The tendency of long array lines in large memories to degrade the shapes of rectangular current pulses is counteracted by incorporating sufficient leakage (i.e., distributed shunt conductance) between each long array line (e.g., each bit-sense line) and its return path to satisfy, at least approximately, Heaviside's formula for distortionless transmission: $r/l=g/c$. The desired shunt conductance may be provided, for example, by using a lossy dieletric as a partially insulating layer between the bit-sense lines and the conductive ground plane of the array, which serves as the common return path.

This invention relates to random-access magnetic memories, particularly those which have very long array lines.

A serious problem which has been encountered in the construction of large-capacity random-access memories is the tendency of long array lines to distort the shapes of the current pulses that are transmitted through these lines. This is especially true of the bit-sense lines in large word-oriented memories. A lengthy array line, with its distributed inductance, distributed capacitance and distributed resistance, will tend to behave as a long communication line rather than a simple conductor when it is transmitting short-duration signal pulses. That is to say, it may exhibit undesirable tendencies to generate spurious pulses and to distort the waveforms of the true signal pulses.

Spurious signals can be eliminated by well-known measures such as the use of so-called "characteristic impedances" for terminating individual lines or individual sections of a line, thereby to prevent reflections of signals from the line discontinuities. A terminating impedance of this kind, however, will merely offset the effects of the distributed inductance and distributed capacitance of the line, which tend to cause reflections, whereas the objectionable distortions of pulse shapes are caused largely by the distributed series resistance of the line, which delays the rise and fall of current pulses and thereby degrades the initially steep edges of these pulses as they pass through the line. Consequently, a pulse which initially has a rectangular shape, for example, may degenerate into a trapezoidal pulse while passing through a long array line, even though such a line is properly terminated in its characteristic impedance. Signal pulses which do not have steep sides are undesirable in memory arrays, as a rule, because they require longer cycle times and thereby reduce the speed of writing and reading operations. Where pulse shape distortion exists, the number of bits per line is limited, and more regeneration loops must be utilized, thereby increasing the cost of the array.

The problem of reducing the distortions of signal waveforms that are caused by distributed series resistance in long transmission lines was recognized early in the development of the telegraphic and telephonic communication arts. Accordingly to a theorem propounded by O. Heaviside in his work on "Electromagnetic Theory," volume I, chapter IV (first published in 1893), distortionless transmission of signals through a submarine cable or other long communication line can be achieved only if the distributed parameters of the line have the mathematical relationship: $r/l=g/c$, where $r$ is series resistance per unit length of line, $l$ is series inductance per unit length of line, $g$ is shunt conductance or leakage per unit length of line, and $c$ is shunt capacitance per unit length of line. In practice, the only line parameters which can conveniently be adjusted in order to reduce waveform distortions are the series inductance and the shunt conductance of the line. If the shunt conductance is kept low (as is usually the case), then the inductance must be increased in order to achieve distortionless transmission.

It is a well-established practice in long distance telegraphy or telephony to augment the distributed inductance of communication lines by means of loading coils or the like in order to comply at least approximately with Heaviside's formula for distortionless transmission. The alternative method of achieving distortionless transmission by purposely incorporating leakage into a transmission line, thereby to increase its shunt conductance without increasing its inductance, has not generally been regarded with favor in communications work, notwithstanding a suggestion by Heaviside that such a technique be tried. Any substantial amount of leakage will attenuate the signal and thus require greatly increased signal amplification or "boosting" to prevent loss of signals in transmission over great distances. In the construction of memory systems, however, different condition prevail. It is not considered desirable to employ loading coils for augmenting the inductance of memory array lines, because the increased line inductance is apt to cause intolerate delays in pulse transmissions. On the other hand (as far as is known), no attention heretofore has been given to the alternative possibility of making memory array lines sufficiently "leaky" to eliminate pulse shape distortions. Thus, while the principle of eliminating waveform distortions by the proper choice of leakage conductance was well known in the fields of telegraphy and telephony, it was not practised in those fields; nor was this technique made available to persons working in the large-scale data-storage field, even though it might have provided a possible solution to the long-standing problem of eliminating pulse shape distortion.

An object of the present invention is to provide improved distortionless array lines for use in random-access magnetic memory systems of large size.

Another object is to provide a long memory array line which inherently preserves the true shape of each pulse transmitted through the line, despite any attenuations which the pulse may undergo and without significantly delaying the pulse in transit.

Still another object is to provide a magnetic film memory or core memory having long array lines which will atenuate but not distort the pulses transmitted through these lines, and a further object is to match each bit storage cell on a line to the attenuation property of its respective line section so that all storage cells are subjected to magnetic fields of proper strength and also in order that output signals of substantially uniform strength can be obtained from all active bit positions on the line.

A still further object is to provide all of the foregoing advantages in a novel type of memory construction which is suited for manufacture by economical batch-fabrication methods.

As used herein, the terms "resistance," "inductance," "capacitance" and "conductance" should be understood in general to denote the following parameters:

$r$=series resistance per unit length of line
$l$=series inductance per unit length of line
$c$=shunt capacitance per unit length of line
$g$=shunt conductance or leakage per unit length of line Whenever a different meaning for any of the above-quoted terms is intended, it will be expressly stated herein.

The principle of the present invention is fulfilled when the various parameters of an array line are so distributed that the ideal relationship for distortionless transmission, $r/l=g/c$, is at least approximately satisfied at every point on the line. This does not necessarily require a smooth or continuous distribution of the aforesaid parameters along the line; nor does it necessarily follow from the above-stated equation that the so-called "characteristic impedance" (which is proportional to the square root of $l/c$) must be constant or even approximately constant at all points along the line. The particular functions that are performed by array lines in memories will tend to impose requirements upon these array lines which are different from, and in some respects more stringent than, the requirements that are imposed upon transmission lines used in general communications work. For instance, as mentioned hereinabove, the practice of using loading coils to reduce distortion on transmission lines is not a feasible expedient when it is applied to long array lines in a memory.

The alternative technique of providing leakage in the array lines to reduce distortion would not be feasible, either, if the conventional practice of utilizing uniform bit storage cells throughout the array were followed. Under these circumstances there would be a disproportionate relationship between signal strengths and storage cell properties in most of the bit storage positions of the array, due to the attenuating effects of the leakage in the array lines. Hence, it is clear that the effective correction of waveform distortions in the array lines of very large memories must be based upon novel concepts which, until now, have not generally been proposed to those who are engaged in the design and manufacture of such apparatus.

To carry out the principle of the invention as it is disclosed herein, the respective bit storage cells positioned along each bit-sense line in a word-oriented memory array have sizes or magnetic properties that are graduated in progressive fashion from one end of the line to the other, whereby all bit storage elements are subjected to magnetic fields of proper strength and all output signals are of uniform strength. This gradation can be accomplished, for example, by tapering the width of the bit-sense lines of a continuous-sheet magnetic film memory so that the big storage spots or cells formed at the respective intersections between each bit-sense line and the various word lines are progressively varied in size according to their respective distances from one end of the line. Thicknesses of the storage film spots can be varied, too, in a similar manner. The storage cells also can have graduated material properties to achieve the same end. Another way in which to accomplish the same purpose would be to arrange the bit cells in graduated groups, each group comprising cells with uniform properties within that group, and the various groups differing from one another in progressive fashion. Still other alternatives will be mentioned hereinafter.

The purpose of the general arrangement just described is to match each bit storage cell to the attenuation of its respective line section. Thus, an attenuated bit pulse which has reached a position remote from the driving end of the line can cause a bit of information to be stored just as effectively as a bit pulse which has not yet traveled any appreciable distance from the driver. Conversely, during readout, a bit storage cell that is remote from the sense amplifier may yield more stored energy than does a cell which is near the sense amplifier, which agrees with the fact that the intervening attenuation on the line requires a stronger sense signal initially in order to insure uniform output signal amplitudes.

The foregoing and other objects, features and advantages of the invention will be apparent from the following more particular description of preferred embodiments of the invention, as illustrated in the accompanying drawings wherein.

Figure 3:
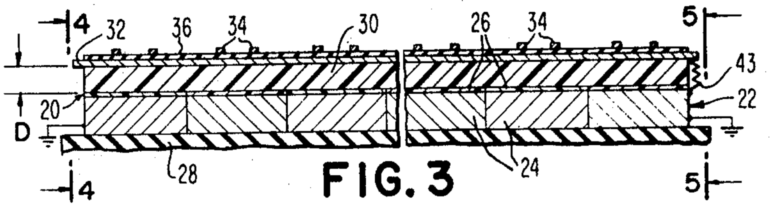
FIG. 3 is a vertical section through the array of FIG. 1, taken on the line 3—3 therein.
Figure 4:
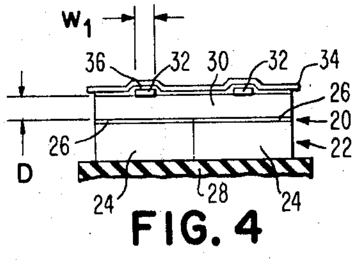
Figure 5:
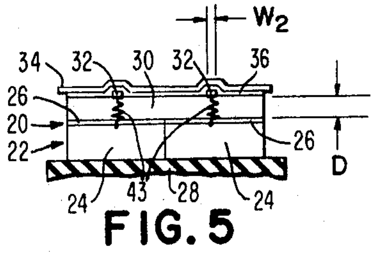

FIGS. 4 and 5 are end views taken on the lines 4—4 and 5—5, respectively, in FIG. 3.

Figure 6:
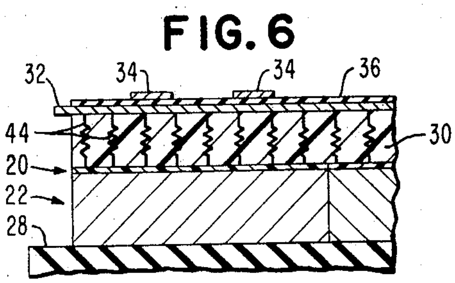

FIG. 6 is a fragmentary, enlarged, vertical section similar to FIG. 3, schematically showing the distributed shunt conductance or leakage which is provided between the forward and return conductors of each bit-sense line in order that distortionless transmission can take place in said line according to the invention.

Figure 7:
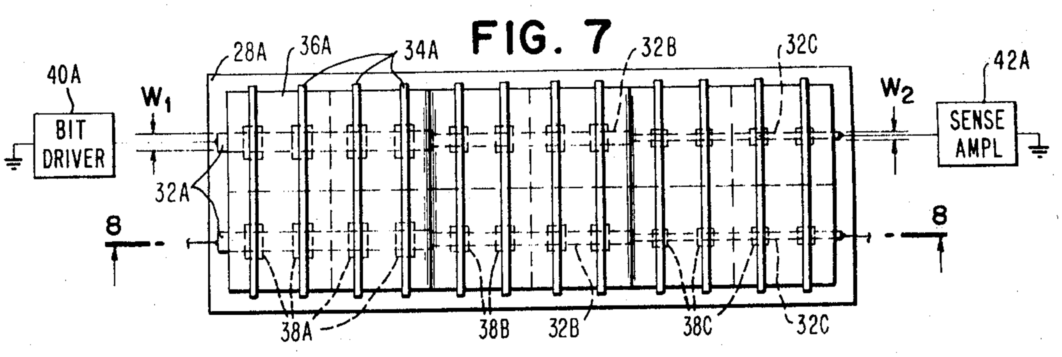

FIG. 7 is a schematic plan view of another embodiment of the invention wherein the storage cells are grouped according to different sizes, and the leakage conductances are lumped at intervals rather than being uniformly distributed.

Figure 8:
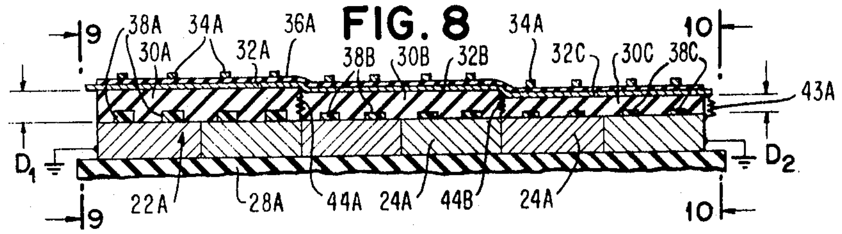
Figure 9:
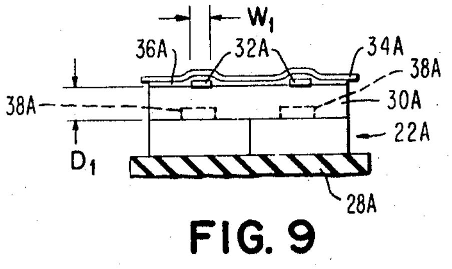
Figure 10:
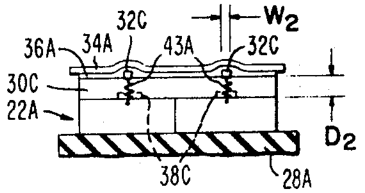

FIGS. 8, 9 and 10 are various vertical views taken on the lines 8—8, 9—9, and 10—10, respectively, in FIGS. 7 and 8.

Figure 11:
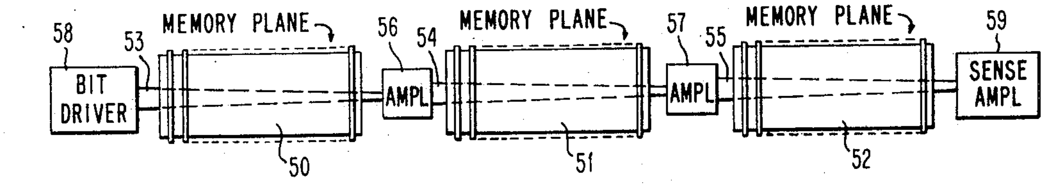

FIG. 11 is a schematic plan view showing the manner in which several memory planes of the present type may be arranged in tandem to provide extended bit-sense lines having distortionless transmission characteristics.

Figure 12:
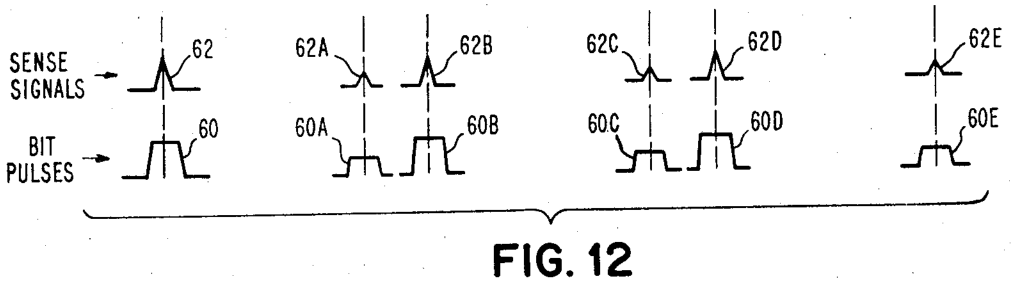

FIG. 12 is a pulse diagram of typical bit pulses and sense signals that may appear at various points in an extended bit-sense line of the kind shown in FIG. 11.

The term "distributed" is applied herein to the various line parameters of resistance, inductance, capacitance and conductance to denote a substantially continuous distribution of such parameters along a line, but the use of this term does not exclude the lumping or bunching of the aforesaid parameters at a sufficiently large number of points along the line to approximate a smooth or continuous distribution thereof, nor does it necessarily means a uniform distribution of such parameters in all parts of the line. To carry out the purpose of this invention there is only one basic requirement, namely, that the ratio which the distributed series-type parameters $r$ and $l$ have to each other shall be approximately equal to the ratio which the distributed shunt-type parameters $g$ and $c$ have to each other in every part of the line; or to state this another way, the ratio of the nonreactive distributed parameters $r/(g)$ shall be approximately equal to the ratio of the reactive distributed parameters $l/(c)$ at each point on the line. The manner in which this interrelationship of distributed parameters can be achieved according to the invention will now be explained.

Figure 1:
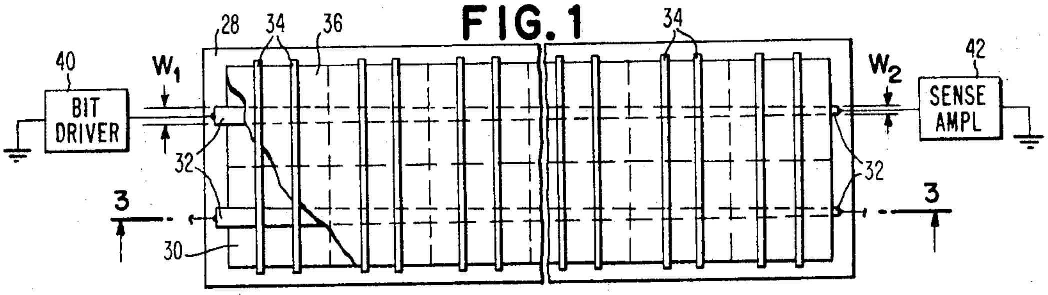
FIG. 1 is a plan view schematically showing a word-oriented magnetic film memory embodying the invention (only a few of the word and bit lines of the array being shown in this figure).

An illustrative embodiment of the invention is shown in FIGS. 1–6. Referring first to FIGS. 1 and 3, a large sheet or film 20 of magnetic material is supported by a conductive plate or ground plane 22, which (as shown best in FIG. 3) may comprise individual sections 24 assembled together in a coplanar relationship. Each of these ground plane sections 24 has on its upper surface a film 26 of magnetic material, the various films 26 together forming the magnetic sheet 20. The ground plane sections 24 provide a modular construction which is useful in assembling memory arrays of very large size. If preferred, however, each of the members 20 and 22 can be integral rather than sectional, where such construction is feasible.

Overlying the magnetic sheet 20 is a layer 30 of insulating material such as silicon monoxide. The magnetic sheet 20 and the insulating layer 30 can be deposited by evaporation, sputtering or any other suitable deposition method upon the ground plane 22. The insulating layer 30 can be deposited by evaporation, sputtering or any other suitable deposition method upon the ground plane 22. The insulating layer 30 preferably is an integral body of material having (in the present form of the invention) a substantially uniform thickness D, FIG. 3. As will be explained in greater detail hereinafter, the layer 30 need not be a perfect dielectric, and in fact it is assumed to be a "lossy" dielectric in this particular embodiment of the invention.

Positioned above the insulating layer 30 are the coordinate array lines 32 and 34 of the memory, only selected ones of which are shown in FIGS. 1 and 3. It is assumed herein that the memory is in the form of a two-dimensional word-oriented array in which the lines 32 serve as bit-sense lines while the lines 34 function as word lines. In the fabrication of this array, the bit-sense lines 32 first are deposited as strip conductors upon the exposed surface of the insulating layer 30. Then a suitable layer 36 of insulating material is deposited by sputtering or by any other suitable method upon the bit-sense line subassembly, thereby coating the exposed surfaces of the conductors 32 with insulation. Following this, the strip conductors 34 of the word lines are deposited upon the insulating layer 36 in tranverse relation to the bit-sense conductors 32. (As previously mentioned, not all of the conductors 32 and 34 actually used in the array are represented in FIGS. 1 and 3.)

Figure 2:
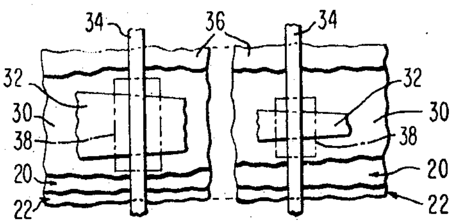
FIG. 2 is a fragmentary plan view showing in greater detail the variation in the sizes of the storage cells according to one embodiment of the invention.

The word lines 34 of the array are of limited length, each of these lines 34 crossing only a relatively small number of bit-sense lines 32 equal to the number of bits contained in a word of stored information. The bit-sense conductors 32, however, can be very lengthy, each of these conductors 32 traversing a great many word lines 34. At each of the crossover points in the matrix of intersecting bit-sense lines 34 and word lines 34 a bit storage cell 38 is defined in the magnetic film 20, as represented in FIG. 2. Each storage cell 38 comprises that portion of the magnetic layer 20 which is in the common vicinity of a word line 34 and a bit-sense line 32. The longitudinal dimension of each cell 38 is determined by the width of the bit-sense conductor 32 at that point, and its lateral dimension is determined by the width of the word conductor 34. The word lines 34 are assumed herein to be of uniform width throughout the array. However, each bit-sense conductor 32 has a tapered configuration, the purpose of this taper being explained presently. The widest part of each bit-sense conductor 32, having a width $W_1$, FIGS. 1 and 4, is electrically connected to a bit driver 40, schematically represented in FIG. 1, while at its narrow end, which has a width $W_2$, FIGS. 1 and 5, each conductor 32 is electrically connected to a sense amplifier 42. The respective sizes of the storage cells 38 on each line 32 will vary according to the taper of this conductor.

The magnetic layer 20 preferably is anisotropic, having an easy axis of magnetization extending parallel to the word lines 34. Hence, each bit storage cell 38, FIG. 2, has an easy axis that is parallel with the adjacent word line 34 and transverse to the adjacent bit-sense line 32. Each of these cells 38 is adapted to be magnetized in one direction or the other along its easy axis to represent a stored binary 1 or a stored binary 0 as the case may be. When information is to be written or entered into a cell 38, coincident-current "write" pulses are sent through the respective word line 34 and bit-sense line 32, and the interaction of the orthogonal magnetic fields respectively set up by the word and bit pulses will cause the respective storage cell 38 to be magnetized in the desired direction along its easy axis, according to well-known principles.

When a stored bit of information is to be read out of a storage cell 38, a "read" current pulse is sent through the associated word line 34, thereby rotating the magnetization vector of the cell 38 and inducing a voltage in the associated bit-sense line 32. This induced voltage produces a readout pulse or sense signal in the line 32, which pulse or signal is transmitted along the line 32 to the sense amplifier 42, FIG. 1. During readout, all of the storage cells on a selected word line 34 are switched, thereby concurrently reading out all of the stored bits contained in that word information. During writing operations a selected word line 34 is energized along with bit drivers as 40. (The drivers for the word lines 34 are not shown herein.)

Although the conductors 32 and 34, respectively, have been referred to herein as "bit-sense lines" and "word lines," each of these conductors actually constitutes only a part of a complete bit-sense line or word line. For instance, each bit-sense conductor 32 actually is connected electrically through various paths (including a bit driver 40, a sense amplifier 42 and a terminating resistor 43) to the ground plane 22, FIG. 3, which acts as a common return path for the bit or sense current pulses which are transmitted through all of the conductors 32. Likewise, the various conductors 34 of the word lines may be electrically connected through suitable means to the ground plane 22, which serves as a common return path for word current pulses transmitted through all of the conductors 34. For convenience, therefore, it will be assumed herein that whenever reference is made to a "bit-sense line" or a "word line," this includes by implication the common return paths through the ground plane 22, which actually are parts of the looped array lines.

It has been mentioned hereinabove that each array line has certain distributed parameters therein, respectively consisting of inductance, capacitance, series resistance and (in the present instance) shunt or leakage conductance. The resistance and inductance are distributed serially along each line, whereas the capacitance and leakage conductance are distributed in shunt between each array line and the ground plane of the array (or in other words, between the arms of the array line loop). The series resistance of each line consists primarily of the simple ohmic resistance of the conductors themselves. The inductance comprises the self-inductance of the conductors along with any inductive loading that may be provided by the magnetic film 20. The shunt capacitance of each line is provided by the layer of dielectric material 30 inserted between the forward and return paths of each array line (that is, between each conductor as 32 and the ground plane 22).

In accordance with the present embodiment of the invention, the dielectric layer 30 is not a perfect insulator but is, instead, a "leaky" insulator. It also may be referred to as a "lossy" dielectric. Thus, as indicated in FIG. 6, the layer 30 has numerous leakage paths through it, represented schematically by the parallel resistors 44. In the present embodiment it is assumed that an infinite number of such leakage paths may exist in the dielectric layer 30 between each bit-sense conductor 32 and the ground plane 22. Dielectric materials having the desired "lossy" property are readily available. The combined conductance of the parallel paths 44 in each unit length of the bit-sense line 32 is the "conductivity" of said line, mathematically represented herein by the symbol $g$.

In the present description attention will ge given primarily to the bit-sense lines 32 rather than to the word lines 34 in describe-in the steps that are herein proposed to correct pulse shape distortion in the array lines. The bit-sense lines, because of their extreme length, are far more susceptible to pulse shape distortion than are the relatively short word lines 34.

In memory operations it is generally desired that the bit and sense current pulses transmitted through the bit-sense lines 32 should have leading and trailing edges which are as steep as possible. If these pulse edges lose their steepness, a longer time then is required for each pulse to produce the effect which it is supposed to produce in the associated circuitry of the system. For maximum speed of memory operations, it is desirable to prevent substantial distortions of the current pulses on the array lines which could cause harmful degradation of the leading and trailing pulse edges. From the standpoint of good signal definition it is preferable to experience at attenuation of pulse amplitude without a substantial loss of pulse shape than to maintain the pulse amplitude intact while losing the optimum pulse shape. The present invention is designed to prevent the distortion of current pulse shapes on the bit-sense lines 32 by a method which involves deliberately incorporating sufficient leakage conductance into these lines to fulfill Heaviside's law for the distortionless transmission of signals through very long communication lines.

According to Heaviside's law as explained above, distortionless transmission over long distances can be accomplished if the distributed parameters of the transmission path have the relationship: $r/l=g/c$. The presence of the $g$ term in this equation assumes that there are distributed leakage paths (such as 44, FIG. 6) which partially shunt the transmission line throughout its length. Such leakage paths have the inevitable effect of attenuating the amplitude of each current pulse transmitted through the line. Where such current pulses are being employed to store energy selectively in magnetic storage elements that are distributed along the line, as in the present case, it is desirable that the current pulse amplitudes be matched to the magnetic properties of the storage elements in every instance.

It may be observed, for example, that each pulse generated by a bit driver such as 40, FIG. 1, will have its maximum amplitude at the end of the bit-sense line 32 is nearest the driver 40. The bit storage cells 38 which are located near this end of the line 32 must have properties such that they will not be switched by a high-amplitude bit pulse in the absence of any coincident word pulses on the corresponding word lines 34. On the other hand, those bit storage cells 38 that are positioned near the end of the line 32 which is remote from the bit driver 40 must be sensitive enough so that they respond to bit pulses of reduced amplitude whenever such cells are being conditioned for a change of state by the appropriate word pulses. If it is assumed that these cells are made of materials having uniform hysteresis characteristics (as in the case of the structure illustrated by FIGS. 1–6, wherein the cells 38 are defined in a homogeneous sheet of magnetic material 20), then the fulfillment of the aforesaid conditions can be accomplished by varying the respective sizes of the cells 38 to correspond with the respective amplitudes of the bit current pulses applied to those cells. As indicated in FIG. 2, such variation in cell sizes is provided by tapering each of the bit-sense strips 32 so that the width of each strip 32 varies from a maximum of $W_1$ at the driving end thereof to a minimum of $W_2$ at its other end.

The effect of the taper in each bit-sense strip 32, when combined with the progressive shunting of the current by the lossy dielectric layer 30, is such that the ratio of the current amplitude to the width of the strip 32 remains substantially constant throughout the length of this strip. Thus, the magnetizing force H applied to each unit length of cell 38 (in a direction transverse to the strip 32) is the same whether the cell is of maximum length or of minimum length (FIG. 2). Hence, these cells 38 can have identical B–H characteristics (or in other words, they can be made of homogeneous material) so long as their sizes are varied to suit the bit current amplitude in the line 32, which is accomplished by providing the taper in each strip 32 as shown.

Referring again to Heaviside's formula for distortionless transmission: $r/l=g/c$, it will be explained how this relationship is satisfied in the present embodiment wherein the conductor 32 has a width that varies inversely in proportion to the distance from the end of said conductor nearest the bit driver 40. As mentioned above, the lossy dielectric layer 30 has a uniform thickness or depth D in the embodiment illustrated in FIGS. 1–6. The leakage paths 44 also are assumed to be uniformly distributed throughout the layer 30 in this embodiment. Hence, at any point along the bit-sense line 32, the shunt conductance $g$ will vary in direct proportion to the width of the tapered conductor 32 at that point. The leakage will be the greatest where the strip 32 has its maximum width ($W_1$), and it will be the least where the strip 32 has its minimum width ($W_2$). Moreover, as will be apparent to those skilled in the art, the shunt capacitance $c$ likewise will vary in direct proportion to the width of the strip 32 in the type of device shown in FIGS. 1–6. Hence, the ratio $g/c$ will be substantially constant at all points along that portion of the bit-sense conductor 32 in which we are interested. The series resistance $r$ varies in inverse proportion to the width of the strip 32, being greatest where this strip is the narrowest. The inductance $e$ also has an inverse relation to the width of the strip 32 in the present structure. The explanation of this last-mentioned feature is as follows:

The self-inductance of a conductor is measured by the rate at which the flux linking this conductor varies in response to a variation in the current flowing through the conductor. In other words, the inductance is the derivative of the instantaneous flux with respect to the instantaneous current producing that flux. In the case of the bit-sense line presently being considered, the flux per unit length of this line is proportional to the magnetic field set up by the bit current and to the distance between the strip 32 and the return path 22 of this line. Hence, for a constant distance between the conductors 32 and 22 of this line, and a constant ratio of the bit current amplitude to the line width, the flux per unit length remains constant along the line. The current, however, decreases in proportion to the line width due to the leakage conductance as described before. Thus the inductance per unit length of the line is inversely proportional to the line width, that is, to the width of the tapered strip 32. (In this instance it has been assumed that the separation between the strip 32 and its ground return 22 is constant. Subsequently herein we shall analyze the conditions which will exist when this separation is variable.) It is apparent that since both $r$ and $l$ vary inversely with the width of strip 32, the ratio $r/l$ will be substantially constant along that portion of the bit-sense conductor 32 in which we are interested.

To recapitulate, each of the two ratios $r/l$ and $g/c$ is substantially constant, and the two ratios are substantially equal to each other, at all points along each bit-sense line 32 in the structure illustrated by FIGS. 1–6. This relationship insures that transmission of current pulses will occur without distortion of current pulse shapes in each of the bit-sense lines 32. Thus, in the case of a bit-write pulse having a substantially rectangular shape, there will be no tendency for this pulse to flatten out into a wide-based trapezoid as it passes through a line 32, as often happens when a rectangular pulse is transmitted through a conventional array line of great length. In the case of a sense signal which consists of a steeply peaked triangular pulse, the peak will not degenerate into a less acute angle as the pulse is transmitted by line 32. In either case, the steepness of the leading and trailing pulse edges is preserved, so that a minimum cycle time is required for each pulse to take effect. Attenuation of these pulses will occur due to the leakage that has been deliberately provided in each of the bit-sense lines 32, but it is a relatively simple matter to amplify an attenuated pulse to the desired amplitude if no wave-shaping is required in the amplification process.

Merely because the formula $r/l=g/c$ is fulfilled, it does not necessarily follow that the line 32 will have a uniform characteristic impedance throughout its length. The characteristic impedance in any given section of a transmission line is measured by the square root of $L/C$, where L and C, respectively, are the series inductance and the shunt capacitance of that line section. In the structure illustrated by FIGS. 1–6, the inductance and the capacitance vary in different ways along each of the tapered strips 32, the inductance varying inversely in proportion to the width of this strip. Hence, in this particular embodiment the characteristic impedance of each line 32 varies inversely in a nonlinear fashion with the line width.

The terminating resistor 43, FIG. 3, has a value which is selected to match the inductance and capacitance of the line 32 at its end, thereby to prevent reflections of the bit pulses at this end of the line. Subsequently herein some attention will be given to other equivalent arrangements in which the characteristic impedance may have a constant value throughout the length of each bit-sense line.

In the embodiment of FIGS. 1–6 it is assumed that the magnetic sheet or film 20 has a uniform thickness. In practice this could cause a variation in the respective amplitudes of the sense signals which are received by a sense amplifier 42 from the various storage cell positions along the associated bit-sense line 32, as the result of signal attenuation caused by the leakage in the line. To compensate for this attenuation, the thickness of the magnetic film 20 would have to vary from a maximum thickness at the side of the array remote from the sense amplifier to a minimum thickness at the side of the array nearest this amplifier. Alternatively, the storage cells could be formed as individual film spots having various thicknesses, as will be explained in greater detail presently.

If it is desired that each of the bit-sense lines 32 have a uniform width, then the inherent magnetic properties of the materials constituting the bit cells 38 will have to be varied in order that the "write" and disturbance thresholds of the various bit cells will be matched to the attenuated current pulse amplitudes. This can be accomplished by forming the bit cells as discrete film spots of different materials. Generally, however, it is preferred that the cells be formed of a material having uniform magnetic properties, and any adjustment for attenuation of the bit pulses then will have to be made by varying the width of each bit-sense line rather than by varying the inherent material properties of the individual cells. In any instance where the bit cells are described herein as being formed individually, this will be done for a reason other than to compensate for the attenuation of the bit pulses by the lossy dielectric.

If one prefers to use array lines which have uniform characteristic impedances throughout their lengths, this can be accomplished by providing a dielectric layer in which the thickness is tapered from a maximum value at the side of the array nearest the bit driver 40, FIG. 1, to a minimum value at the side of the array nearest the sense amplifier. It was explained hereinabove that with a tapered bit-sense strip 32, the capacitance $c$ tends to vary directly with the width of the strip 32, whereas the inductance $l$ tends to vary inversely with the width of this strip. However, if the thickness of the dielectric layer 30 likewise varies in proportion to the width of the strip 32, as now proposed, then the capcitance $c$ tends to remain constant at all points along the line 32. Moreover, due to the fact that the strip 32 approaches the ground plane 22 at then arrow end of said strip, the magnetic flux now also diminishes at the narrow end of the strip 32. This offsets the tendency of the narrow end to increase the value of the inductance $l$, so that $l$ now maintains a substantially constant value at all points along the line 32. Thus, the characteristic impedance $Z_0$ of the line 32 (which is equal to the square root of $L/C$) is now maintained constant throughout the length of this line.

Under the conditions just assumed, the resistance $r$ of the strip 32 will (as before) increase in inverse proportion of the decreasing strip width. With $l$ and $c$ now being constant and $r$ varying as just stated, the formula for distortionless transmission requires that the conductance $$g=r/Z_0^2$$

where $Z_0$ is the characteristic impedance of assumed constant value. With the series resistance $r$ varying inversely according to the width of the strip 32, the shunt conductance $g$ then must vary in the same manner in order to satisfy the formula. If it be assumed that the lossy dielectric layer 30 is tapered as just described, then the lengths of the leakage paths therethrough will decrease as the thickness of layer 30 decreases, thereby tending to increase the conductance $g$ as the layer 30 gets thinner. However, this tendency is opposed by the tendency of the conductance $g$ to decrease as the strip 32 gets narrower and thereby eliminates some of the parallel leakage paths through the layer 30. If anything, therefore, the conductance $g$ would tend to remain constant under these circumstances, thereby defeating the purpose of equating $g$ with $r/Z_0^2$ at all points along the line. To comply at least approximately with the formula for distortionless transmission under the conditions just assumed, therefore, the inherent conductance of the lossy dielectric layer would have to be augmented by providing additional conductances of appropriate values between the strip 32 and the ground plane 22, so that the resultant conductance per unit length of line will vary approximately in inverse proportion to the width of the strip 32.

FIGS. 7–10 illustrate an embodiment of the invention in which the various modifications described above are incorporated. In this construction there is a dielectric layer comprising a plurality of discrete sections such as 30A, 30B and 30C of different thicknesses, which together approximate a tapered dielectric layer varying in thickness from $D_1$ to $D_2$. To simulate a tapered strip line varying in width from $W_1$ to $W_2$, each bit-sense line has sections 32A, 32B and 32C of progressively different widths, which are positioned respectively on the dielectric sections 30A, 30B and 30C. Bit storage cells 38A, 38B and 38C of different sizes are formed as discrete deposits of magnetic film material having different cell lengths and thicknesses, respectively positioned beneath the line sections 32A, 32B and 32C. There is no continuous magnetic layer in this embodiment. The dielectric layer 30A–30B–30C need not be a lossy insulator. Leakage may be provided by discrete shunt conductances represented in FIG. 8 by the lumped resistors as 44A and 44B which are positioned at the junctions of adjoining dielectric sections 30A, 30B and 30C of different thicknesses, the respective values of these resistors such as 44A and 44B being selected in accordance with the above-stated design considerations. In practice there would be many more shunt resistors and dielectric sections of graduated thicknesses than are shown in FIG. 8, which does not purport to be a complete showing of this embodiment.

The remaining members 22A, 24A, 28A, 36A, 40A, 42A and 43A shown in FIGS. 7–10 correspond to the similarly numbered members which are shown in FIGS. 1–6. It should be mentioned that the terminating resistor 43 is equal to the characteristic impedance $Z_0$ of the entire bit-sense line 32A–32B–32C. However, the intermediate shunt resistors 44A and 44B are not necessarily equal to the characteristic impedances of their respctive line sections 32A and 32B. Hence, some slight signal reflection may occur at each of the bit-sense line discontinuities. These effects, however, are considered to be insignificant since it assumed that in practice there will be a large number of graduated line sections, thereby making the transitions between line sections so gradual as to produce only negligible reflections at the various junction points.

The type of construction shown in FIGS. 7–10, wherein the bit storage cells, array line sections, dielectric layers and leakage conductances are arranged in graduated groups, is adapted for batch fabrication on a large scale. While this design does not approach the theoretically ideal relationship of the line parameters as closely as does the construction shown in FIGS. 1–6, it nevertheless provides reasonably close approximation thereto and is a very significant improvement over conventional memory designs.

In extremely large word-oriented memories which employ "leaky" bit-sense lines of the type recommended herein for distortionless transmission, it may become necessary to provide intermediate amplification or "boosting" at intervals along each of these lines to prevent the loss of bit and sense signals by attenuation. FIG. 11 schematically represents a tandem arrangement of memory planes 50, 51 and 52, each of the general type described hereinabove, having their corresponding bit-sense lines such as 53, 54 and 55 connected in series between the bit drivers as 58 and the sense amplifiers as 59 through intermediate booster amplifiers as 56 and 57. Thus, a bit pulse such as 60, FIG. 12, generated by a bit driver 58, FIG. 11, will be attenuated to some reduced size, as indicated at 60A, in passing through the memory plane 50. Thereupon it is boosted by the amplifier 56 to produce an amplified bit pulse 60B having the original bit pulse amplitude and shape, which then is attenuated to a reduced size 60C in passing through memory plane 51. Amplifier 57 then boosts the bit pulse back to its initial amplitude and shape, as shown at 60D, and after passing through memory plane 52, this bit pulse has a reduced amplitude as represented at 60E. Throughout all of these successive attenuations and amplifications, however, the bit pulse retains its original shape; that is to say, its leading and trailing edges will retain their initial steepness throughout the transmission of the bit pulse because of the distortionless transmission properties of the bit-sense lines 53, 54 and 55. No wave shaping is required in the amplifiers 56 and 57.

A similar observation can be made in regard to the transmission of the sense signals on the aforesaid bit-sense lines. Assume that a sense signal 62 having a steeply-peaked triangular configuration is generated on the bit-sense line 53 in response to a read signal on the first word line (not shown) of the memory plane 50. In passing successively through the interconnected distortionless transmission lines 53, 54 and 55 to the sense amplifier 59, the sense signal 62 is successively attenuated, amplified and attenuated again (as indicated at 62A, 62B, 62C, 62D and 62E, respectively, FIG. 12) without losing its original steep-sided shape. The booster amplifiers 56 and 57 merely perform an amplifying function. No wave shaping is required in view of the distortionless quality of the pulse transmission.

Although the invention has been described hereinabove as applied specifically to magnetic film memories, it can be applied also to magnetic core memories having extended array lines. In this case, the cores strung on each of the distortionless array lines will have graduated sizes or properties to match the pulse amplitudes at various points along that line. In other words, the respective core radii may vary approximately in proportion to the attenuation of the pulse amplitude, or the material properties of the cores may vary if their sizes do not. As in the case of the film storage elements which were employed in the above-described embodiments of the invention, the cores can be arranged in groups that are graduated according to core sizes or properties.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a random-access memory array having parallel rows of magnetic information storage cells which are adapted to be energized selectively for storing data bits therein or for reading stored data bits therefrom, the combination comprising:

array lines each paralleling a respective row of said cells for conducting current pulses which are involved in the storing of data bits in said cells or the reading of stored data bits therefrom, each of said lines including a conductor inductively coupled to the storage cells of a row, and means providing a return path for the current pulses transmitted through said conductor, each of said lines having series resistance and series inductance distributed therein and also having a capacitance distributed in shunt between the conductor and the return path of said line, and leakage means arranged to provide distributed shunt conductance between the conductor and the return path of each of said lines in a manner such that the ratio of the shunt conductance to the shunt capacitance per unit length of said line is at least approximately equal to the ratio of the series resistance to the series inductance per unit length of said line, thereby enabling each of said lines to conduct current pulses having relatively steep edges substantially without distorting the shapes of such pulses.

2. A combination as set forth in claim 1 wherein said leakage means comprises a lossy dielectric material interposed between the conductor and the return path of each of said lines.

3. A combination as set forth in claim 1 wherein the ratio of inductance to capacitance per unit length of said line is substantially constant throughout the length of said line, thereby providing all portions of said line with a substantially uniform characteristic impedance.

4. A combination as set forth in claim 3 wherein the shunt conductance per unit length of said line is substantially equal to the quotient of the series resistance per unit length of said line divided by the square of the characteristic impedance of said line.

5. In a random-access memory array, the combination comprising:

parallel rows of magnetic information storage cells which are adapted to be energized selectively for storing data bits therein or for reading stored data bits therefrom, each of said lines including a conductor inductively coupled to the storage cells of a row, and means providing a return path for the current pulses transmitted through said conductor, each of said lines having series resistance and series inductance distributed therein and also having capacitance distributed in shunt between the conductor and the return path of said line, and leakage means arranged to provide distributed shunt conductance between the conductor and the return path of each of said lines in a manner such that the ratio of the shunt conductance to the shunt capacitance per unit length of said line is at least approximately equal to the ratio of the series resistance to the series inductance per unit length of length of said line, thereby enabling each of said lines to conduct current pulses having relatively steep edges substantially without distorting the shapes of such pulses, each of said array lines and its associated row of cells being so constituted and arranged in relation to each other that each current pulse transmitted through said line during the storage of information in said cells has equivalent magnetizing effects upon all of the cells in said row, notwithstanding the attenuation of the pulse amplitude in said line due to the distributed shunt conductance thereof.

6. A combination as set forth in claim 5 wherein:

each of said line conductors is in the form of a conductive strip having a width that progressively decreases from a maximum width at the driving end of said line to a minimum width at the opposite end of said line, and the cells in each of said rows have magnetic response thresholds that vary according to the width of said strip at the respective cell positions.

7. A combination as set forth in claim 6 wherein the separation between each of said conductive strips and its associated return path varies as the width of said strip varies.

8. In a word-oriented random-access memory array, the combination comprising:

a plurality of parallel word lines, a plurality of parallel bit-sense lines extending transversely of said word lines each of said bit-sense lines including a conductive strip having a driving end and a sensing end, the width of said strip decreasing progressively from its driving end to its sensing end, and a current return path coextending with said strip in spaced relation thereto, a matrix of magnetic information storage cell, each of said cells being inductively coupled to a particular one of said word lines and to a particular one of said bit-sense lines, dielectric material interposed between the conductive strip and the current return path of each of said bit-sense lines to provide said bit-sense line with distributed shunt capacitance, and leakage means interposed between the conductive strip and the current return path of each of said bit-sense lines to provide said bit-sense line with distributed shunt conductance, each of said bit-sense lines also having distributed series resistance said distributed series inductance, the ratio of the series resistance to the series inductance per unit length of said bit-sense line being at least approximately equal to the ratio of the shunt conductance to the shunt capacitance per unit length of said bit-sense line, thereby to afford substantially distortionless transmission of current pulse through each of said bit-sense lines.

9. A combination as set forth in claim 8 wherein said leakage means constitutes multiple leakage paths in said dielectric material.

10. A combination as set forth in claim 8 wherein the separation between the conductive strip and the return path in each of said bit-sense lines decreases progressively from the driving end of such line to the sensing end thereof, thereby to maintain an approximately constant ratio between the inductance per unit length of such line and the capacitance per unit length of such line.

11. A combination as set forth in claim 8 wherein said matrix of storage cells is defined in a sheet of magnetic material, each of said cells having a predetermined width that is dependent upon the width of its word line and an individual length that is determined by the width of the bit-sense strip at the respective cell position.

12. A combination as set forth in claim 8 wherein each of said storage cells has a predetermined width related to the width of its word line and an individual length determined by the width of the bit-sense strip at the position of such cell.

13. A combination as set forth in claim 12 wherein the storage cells associated with each of said bit-sense lines have individual thicknesses that vary progressively from a maximum thickness near the driving end of such line to a minimum thickness near the sensing end of such line.

References Cited

UNITED STATES PATENTS

| | | | |
|---|---|---|---|
| 3,230,390 | 1/1966 | Sterzer | 307—88.5 |
| 3,362,065 | 1/1968 | Lauriente et al. | 340—174 XR |

OTHER REFERENCES

Genuit, L. L.: An Improved Current Control Circuit for Core Memory Drive, Technical Information Series, General Electric, Oct. 1, 1963, p. 8.

BERNARD KNOICK, Primary Examiner

GARY M. HOFFMAN, Assistant Examiner

U.S. Cl. X.R.

307—208; 333—24